Dec. 15, 1970  J. E. ANDERSON ET AL  3,548,336
METHOD AND APPARATUS FOR PRODUCING CONTINUOUS WAVE LASER ENERGY
Filed Oct. 28, 1966  2 Sheets-Sheet 1

INVENTORS.
JOHN E. ANDERSON
JOHN E. JACKSON
BY
ATTORNEY

United States Patent Office 3,548,336
Patented Dec. 15, 1970

3,548,336
METHOD AND APPARATUS FOR PRODUCING CONTINUOUS WAVE LASER ENERGY
John E. Anderson, Murray Hill, N.J., and John E. Jackson, Indianapolis, Ind., assignors to Union Carbide Corporation, a corporation of New York
Continuation-in-part of application Ser. No. 517,274, Dec. 29, 1965. This application Oct. 28, 1966, Ser. No. 594,646
Int. Cl. H01s 3/09
U.S. Cl. 331—94.5      1 Claim

ABSTRACT OF THE DISCLOSURE

Method and apparatus for producing a continuous stream of light energy from a solid laser material by directing light from a concentrated high intensity arc onto a laser material to cause the laser material to continuously emit a coherent beam of light energy.

---

This application is a continuation-in-part of application Serial No. 517,274, filed Dec. 29, 1965, which application is now abandoned.

This invention relates to continuous lasers, and more particularly to a method and apparatus for achieving continuous laser action and to methods of using such continuous laser action.

Much has been said concerning the potential for the laser especially in material processing. However up until now, the laser has had severe limitations in the material processing field and especially in welding. Laser welding has been achieved heretofore in a pulse mode. Continuous laser action has not been attainable at useful power levels. Up until now, continuous wave lasers could produce only up to about 5 watts of power. Usually at least 10 to 100 watts of power are required to do any continuous welding. These power requirements have heretofore eliminated the laser from the continuous welding market.

We have discovered a method and apparatus for achieveing continuous wave laser action at power levels heretofore unattainable. For example, power levels of about 200 watts have been achieved by the practice of the present invention with the upper limit still to be reached.

Accordingly, it is an object of this invention to provide a method and apparatus for achieving continuous wave laser action at useful power levels.

Another object is to provide a continuous wave laser material treating process.

A further object is to provide a process of welding with a continuous beam of laser energy.

Yet another object is to provide a process for cutting with continuous wave laser energy.

A further object is to provide a solid-state continuous wave laser capable of operating at relatively high power.

Another object is to provide a method for achieving continuous wave laser action wherein an arc is used as the laser pump source.

Figure 1:
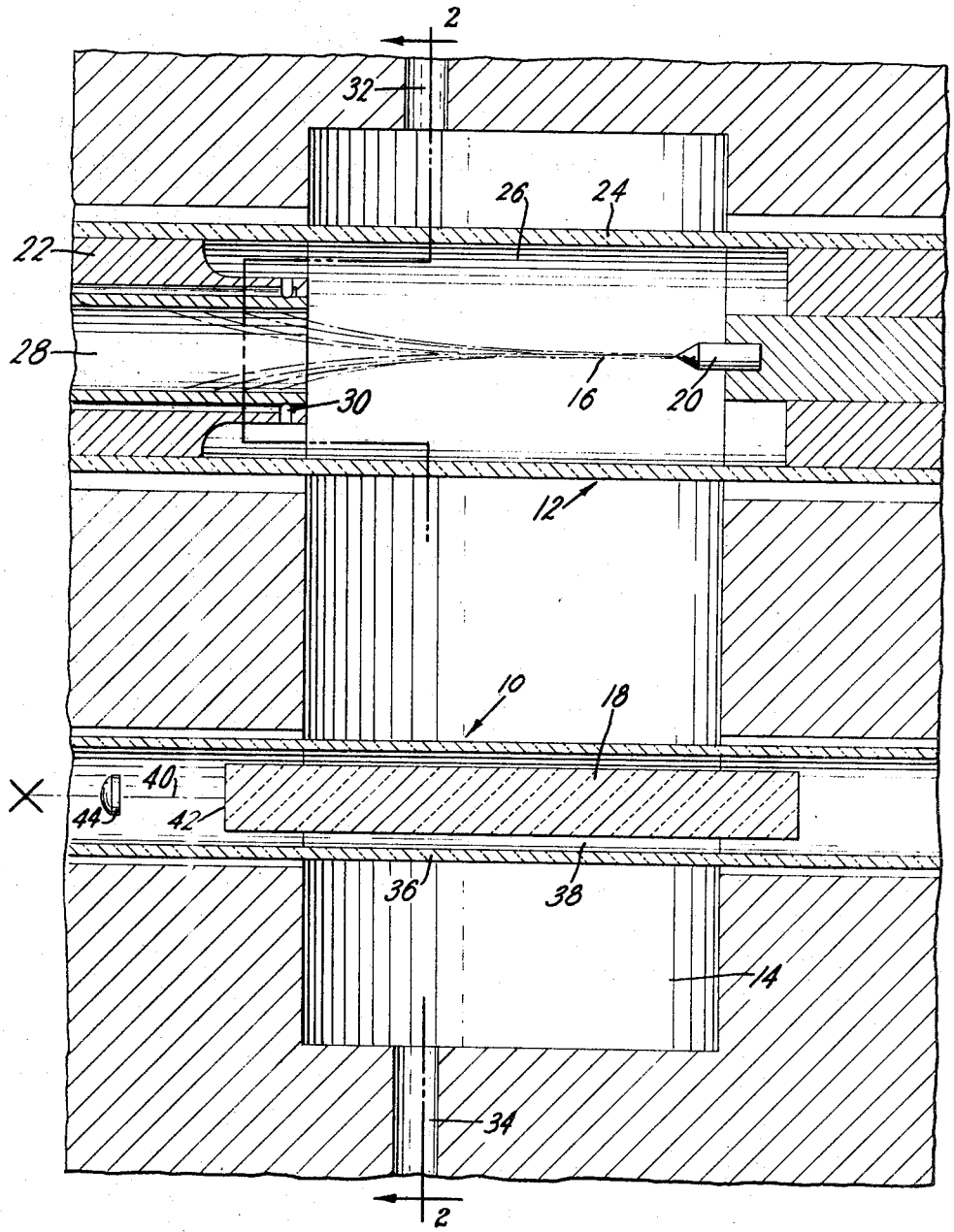
Figure 2:
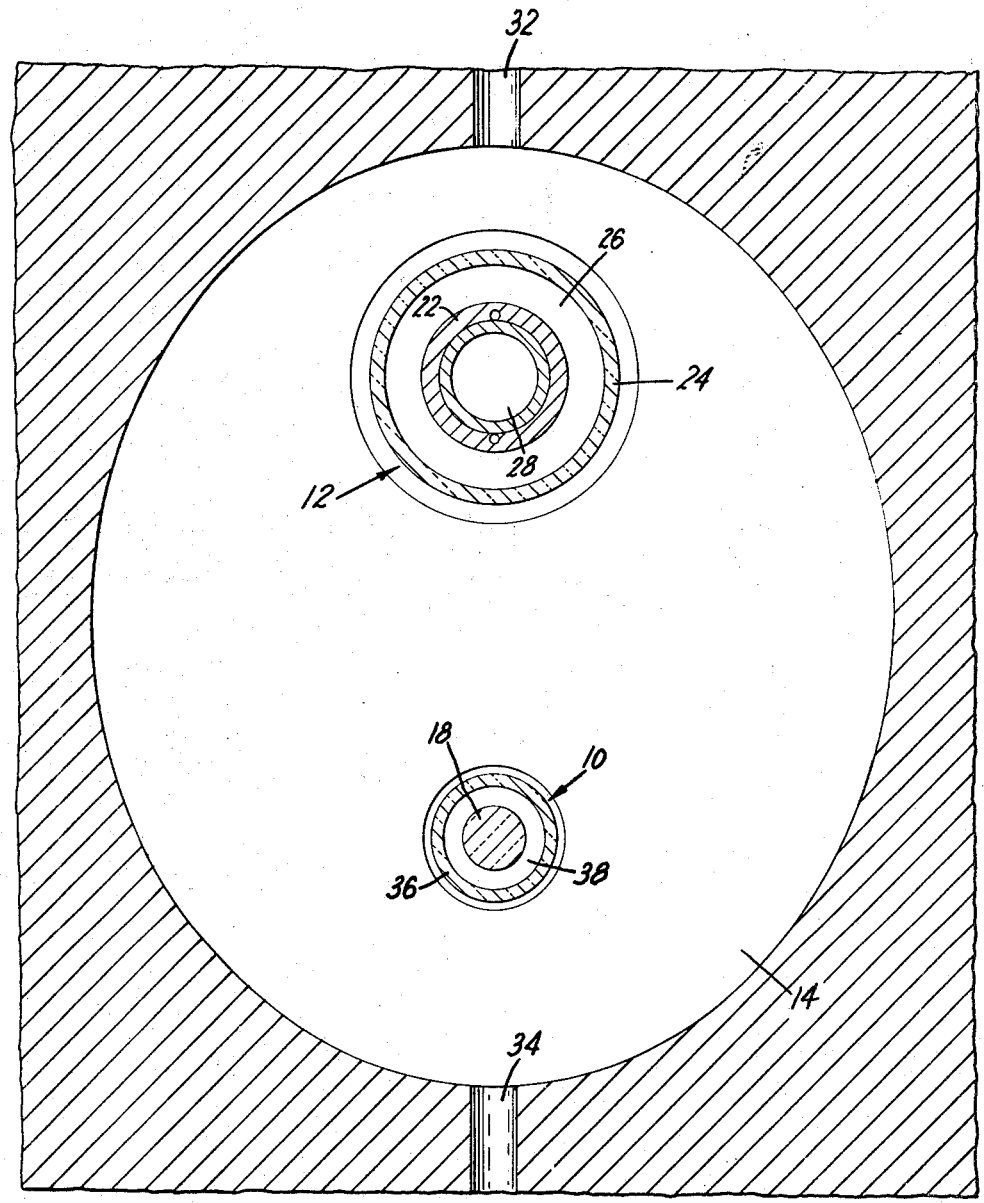

The invention, both as to its organization and its method of operation, together with additional objects and advantages thereof will be best understood from the following description of a specific embodiment when read in connection with the accompanying drawings in which:

FIGS. 1 and 2 are vertical, longitudinal and transverse views in cross section of a typical laser system embodying the invention.

In general, there are two types of lasers—the pulsating type and the continuous wave type. For this disclosure the continuous wave laser may be defined as one in which for a given period of operation, there is always power being emitted from the device. Within these two types, the laser may be of the gaseous type, or it may be of the solid type wherein a suitable solid material usually a crystal is used as the laser source.

One of the problems in the development of a continuous wave solid state laser is the need for a power source capable of serving as the laser material pumping source. Some work, for example, has been done with tungsten filament lamps, which has proved to be only moderately successful in terms of achieving power levels necessary for materials working applications.

In one aspect of the invention there is provided a method for emitting a continuous stream of light energy from a laser material by establishing an arc between two electrodes; concentrating the arc between the electrodes to increase the intensity and radiation output thereof and directing the radiation output on said laser material to thereby cause said laser material to continuously emit a coherent beam of light energy.

In another aspect, the invention provides a solid state continuous wave laser comprising the combination of means providing a chamber; an elongated solid material capable when excited of emanating coherent light from one end thereof; a stabilized lineal high pressure arc source; means supporting said solid material and said arc source in such chamber; and radiation reflecting means in such chamber for concentrating rays from said arc source onto said crystal to excite the latter.

Briefly, according to the invention, a stabilized, high pressure arc operating with a transparent envelope is used as a line radiation source to pump the laser material. The arc radiation source and the laser material are positioned in an elliptical cavity having highly polished walls. In one embodiment, deterioration of the transparent envelope surrounding the arc is prevented by equalizing the pressure on the envelope wall and in another embodiment by providing a thin film of liquid coolant over substantially the entire inner surface of the wall.

In the description that follows reference will be made to a laser crystal. However, it is to be understood that other solid materials can be used. For example, laser glass could be used.

A remarkable feature of the invention is that radiant energy is delivered to the laser material in excess of 2 kw./sq. cm.$^2$ of surface area of the material.

Referring to the drawings, laser crystal assembly 10 and arc radiation source 12 are maintained within an elliptical chamber or cavity 14. The axes of the radiation source and the crystal assembly are located at or in proximity to the foci of the ellipse for maximum utilization of the rays radiated from high pressure arc 16. The walls of chamber 14 are highly polished to efficiently direct radiation to an elongated laser crystal 18. Alternatively, the walls may be coated with materials such as gold to increase the reflectivity in the pumping wave lengths.

The arc radiation source 12 comprises a cathode 20 and an anode 22 spaced in axial alignment with each other in an elongated transparent envelope 24 forming an arc chamber 26. Quartz is a typically suitable material for the envelope. The cathode 20 preferably is constructed of tungsten or tungsten containing thoria.

The anode 22 comprises a nozzle having a central gas exit passage 28, and preferably is constructed of copper for better thermal conductivity and may, for better arc attachment, contain a tungsten insert. As an alernative, the anode 22 may be constructed of copper-silver alloy for high resistance to electrode erosion. Both of the electrodes 20 and 22 are water cooled.

In operation, the high pressure arc 16 is maintained by connecting a suitable power supply to the electrodes, the arc being started by any suitable means, such as a high frequency discharge. Arc gas under pressure is supplied to the arc chamber 26 through a plurality of inlets 30. Inlets 30 are arranged so that the gas is injected in a manner to form a swirling gas flow pattern within the arc chamber. This swirling gas flow pattern yields a stabilized lineal arc that is highly concentrated.

The swirling gas flows along the inner face of envelope 24 toward the opposite end of the chamber from whence the direction of flow reverses to travel toward and out the nozzle near the longitudinal axis of the chamber, still in a swirling fashion. This gas flow pattern creates a "tornado" which, primarily because of the low pressure zone at such axis of the chamber, very effectively constricts and stabilizes the arc.

An alternative to this arc radiation source is that described in copending application Ser. No. 461,874, now abandoned, which application was assigned to the same assignee of the present application. Using such source, the stick cathode is replaced by a second nozzle electrode. The arc gas is again injected to impart a swirling motion. The gas may be injected from either end or both. Preferably the gas in injected from one end only so that impurities, principally electrode erosion are swept out of the end opposite to the gas inlet. This configuration also yields a highly constricted, stabilized lineal arc.

Suitable arc gases are the inert gases of argon, xenon and krypton. These inert gases have a high atomic number which yields a high probability of electronic transition that is necessary for good radiation.

In the operation of an arc radiation source such as this, deterioration of the transparent envelope is a serious problem. More specifically, the transparent material such as quartz, is weak in tension such that it very readily fails due to the combination of the intense heat of the arc and the relatively high pressures in the arc chamber. The invention contemplates solving this problem through pressure equalization. Pressure balance of the system is achieved by maintaining a suitable gas pressure within the cavity 14. To this end, a suitable gas is introduced through an inlet 32 into the cavity from when it flows out through outlet 34. The gas could, of course, be recirculated. A suitable gas for this is argon, or air, for example. When liquid nitrogen is used to cool the laser crystal 18, helium gas may be used. In addition or alternatively, deterioration of envelope 24 can be minimized by surrounding envelope 24 with a second transparent envelope to provide an annular space through which a cooling liquid could be passed. This liquid may be water or it may be one which will absorb undesirable radiation waves.

The radiation rays generated by the radiation source 12 are directed or concentrated on the laser crystal by the reflective inner surfaces of the elliptical chamber 14. The laser crystal 18 is surrounded by a transparent envelope 36, such as quartz. The laser crystal may be fabricated from a single crystal of ruby or neodymium doped yttrium aluminum garnet, for example. Such crystal materials are known to exhibit properties conducive to good lasing action.

The crystal 18 is cooled by circulating a fluid such as water in contact with the crystal through the annular space 38 between the crystal and the envelope 36. Because of the use of the liquid coolant, the crystal assembly is kept leak tight.

The coherent beam of light 40 emanating from end face 42 of the crystal 18 passes through a suitable lens 44 to be focused on object X that is to be welded, for example.

A typical stabilized lineal arc radiation source may be like that disclosed and claimed in the copending application of John E. Anderson, filed Dec. 29, 1965, Serial No. 517,214, which application is now U.S. Patent No. 3,366,-815. In such source, cooling of the inner surface of the envelope is accomplished with a thin film of liquid. The thin film of liquid is spread by the swirling gas to cover substantially the entire surface of the envelope. The liquid may be water, or one that absorbs undesirable radiation rays.

Using the illustrated apparatus, an intense coherent light of 22 watts power was delivered from a yttrium aluminum garnet crystal doped with 1 atomic percent neodymium, with the arc radiation source operating with 135 amperes at 390 volts. Argon gas at the rate of 1500 c.f.h. was fed to the radiation source. The yttrium aluminum garnet crystal was cooled with water. It has been found that when using a neodymium doped yttrium aluminum garnet the coolant should preferably be sodium dichromate. It is theorized that the sodium dichromate absorbs rays in the 3500–5000 A. spectrum in addition to the ultraviolet rays. This apparently aids in pumping neodymium doped yttrium aluminum garnet crystal by eliminating rays which produce undesirable pumping to non-lasting levels.

While reference was made to neodymium doped yttrium aluminum garnet crystal, it should be understood that other neodymium doped crystals, such as calcium tungstate or yttrium vanadates and neodymium doped glass are also useful.

In using the invention for welding, we have not only been able to achieve higher power continuous wave laser action but also we have been able to achieve the high power at the desired wavelengths. In general, the shorter the wavelength, the better the absorption of the energy by the workpiece. A desirable wavelength for a particular material depends on that material's characteristics. According to this invention, we have been able to generate short wavelengths in the order of 1.06 microns from neodymium doped yttrium aluminum garnet at power levels of 205 watts. This beam of light energy is directed onto a workpiece which is moved relative thereto to progressively and uninterruptedly move a molten zone along the work and thus leave a welded joint behind the moving molten zone.

The following example is provided to aid those skilled in the art in understanding the invention and how to apply the invention in welding applications.

Apparatus essentially the same as that shown in FIG. 1 was set up to make a weld. A neodymium doped yttrium aluminum garnet crystal about 1½ inches long and about ⅛ inch in diameter was placed in the apparatus. An arc was established between a tungsten electrode and a copper electrode at 225 amps and 275 volts. Argon was circulated at 1000 c.f.h. in the arc chamber. The crystal was water cooled. A sodium dichromate solution was passed through an annular space provided around the envelope 24 shown in FIG. 1. A butt joint was formed between pieces of .008 inch thick 5 inch long stainless steel. The distance from the quartz focusing lens to the work was about 1.5 inches. The nominal focal length of the lens was 1½ inches. The laser output power was 55½ watts and the weld was made at 4 i.p.m. travel speed. The work was shielded by argon gas. The weld produced was a sound fully penetrated weld.

The invention is also applicable to cutting. The following examples illustrate the continuous wave laser as a cutting tool. Equipment essentially the same as that used for welding was employed. A neodymium doped yttrium aluminum garnet crystal about 3 inches long was used. An arc was established at 150 amps and 450 volts. The laser output power of 88 watts was focused on an 0.010 inch thick stainless steel piece. The travel speed was 2 i.p.m. A clean cut was made.

While the invention has been described by referring to certain preferred embodiments and utilities, it should be understood that the invention may be modified by a person having skill in the art without departing from the spirit and scope of the invention. Further it is obvious that the invention has applicability in other heating processes such as brazing, soldering and others.

What is claimed is:

1. A solid state continuous wave laser comprising the combination of means providing a chamber, an elongated laser crystal capable when excited of emanating coherent light from one end thereof, an arc source having a transparent cyclindrical envelope, electrodes located adjacent the ends of such envelope, and means for creating a swirling flow pattern of suitable gas within said envelope for concentrating a high pressure arc energized between said electrodes to increase the intensity and radiation output thereof, means supporting said crystal and said arc source in such chamber, and radiation reflecting means in such chamber for concentrating rays from said arc source onto said laser material to excite the latter.

References Cited
UNITED STATES PATENTS

| | | | |
|---|---|---|---|
| 3,102,920 | 9/1963 | Sirons | 331—94.5 |
| 3,209,281 | 9/1965 | Colgate et al. | 331—94.5 |
| 3,387,227 | 6/1968 | Mastrup et al. | 331—94.5 |

WILLIAM L. SIKES, Primary Examiner

U.S. Cl. X.R.

313—231; 315—111